United States Patent Office 2,801,152
Patented July 30, 1957

2,801,152

PROCESS OF RECOVERING TUNGSTIC OXIDE SUBSTANTIALLY FREE OF MOLYBDENUM COMPOUNDS

John Bryant Kasey, Bakersfield, Calif.

No Drawing. Application June 23, 1953,
Serial No. 363,686

13 Claims. (Cl. 23—19)

The present invention relates in general to the treatment of mineral material containing tungsten-bearing minerals, and more particularly to mineral materials containing tungsten-bearing minerals and molybdenum compounds isomorphic with the tungsten compounds present in the mineral material. The invention in one of its forms relates to the treatment of ores and concentrates containing tungsten-bearing minerals, such as wolframite, ferberite, hubernite, pure scheelite, scheelite-powellite, and the like, and the recovery therefrom of tungsten oxide in exceptionally pure form. It may be stated that wolframite defines a group of iron and manganese tungstates of the general formula (Fe, Mn)$WO_4$ intermediate between ferberite, $FeWO_4$, and hubernite, $MnWO_4$.

Ores or concentrates of relatively pure scheelite may be treated as hereinafter set forth. Further, ores or concentrates having variable ratios of scheelite, which is calcium tungstate, and powellite, which is calcium molybdate, said minerals being present in an isomorphic mixture, may be treated in accordance with the present invention to recover a high grade tungsten oxide substantially free of molybdenum and other undesirable elements. Ores or concentrates of tungsten-bearing minerals of sub-grade are not marketable either due to the presence of too much molybdenum content with or without other metal constituents, such as copper, lead, tin, and the like; or the percentage of tungsten, expressed as the oxide, is well below the commercially accepted grade of about 60% $WO_3$. Such sub-grade ores may be effectively treated in accordance with the present invention.

It is desired to point out that scheelite tungsten and scheelite-powellite ore deposits in this country and in other parts of the world are of the contact metamorphic deep-seated type, and tungsten ores of this character generally contain molybdenum not only as molybdenum sulfide, which is relatively easily separated, but also lime compounds of molybdenum including calcium molybdate, $CaMoO_4$, which because it is in isomorphic mixture with the scheelite, $CaWO_4$, cannot be separated by known milling methods employing physical or physicochemical means. Therefore, to recover the tungsten and molybdenum constituents of these ores or concentrates thereof, chemical dissolution methods are employed, usually carried out at moderately high temperatures and at atmospheric or super-atmospheric pressure, followed by separation of the precipitated crude tungsten oxide bearing substantial quantities of impurities, including molybdenum compounds. It is necessary to commercially market the tungsten oxide to remove said impurities, and this is an expensive procedure. Usually the crude tungsten oxide is redissolved in an alkaline medium, and the tungsten oxide carrying a lesser amount of impurities, including molybdenum compounds, precipitated from solution. This solution and precipitation is usually effected at least twice to free the tungsten oxide from tenacious impurities. Finally, the so-treated tungsten oxide is usually treated with strong ammonia to form paratungstate, which is filtered from its mother solution, dried, and ignited to produce fairly pure tungsten oxide.

It is apparent that the above prior art process is costly from the standpoint of equipment, labor, and time to produce. The present invention which is efficient and economical is a major improvement thereon. Moreover, the process of the present invention makes possible the utilization of many idle, undesirable but potentially valuable, vast, known sources of tungsten ores occurring in the form of scheelite-powellite ore deposits. Further, ores and concentrates of low tungsten content or burdened with impurities and therefore unsalable will be as readily marketable as 60% grade pure scheelite concentrates. Finally, in one form of the present invention ores and concentrates of the aforementioned type will offer no more difficulty in treatment than straight pure calcium tungstate ores, the cost of treatment being much lower than the prior cost to produce exceptionally pure tungsten oxide.

In accordance with the present invention, tungsten oxide free of molybdenum components may be recovered from mineral materials including tungsten compounds containing molybdenum compounds isomorphic with the tungsten compounds by preferably reducing the mineral material to a divided form, treating the reduced material with a strong acid and especially concentrated hydrochloric acid until the tungsten compounds and the molybdenum compounds are substantially completely brought into solution in said concentrated acid, the latter desirably and preferably being maintained in its concentrated state during the treatment period. The acid may be maintained in its concentrated state in any desired manner. When using concentrated hydrochloric acid gas, loss by hydrochloric acid gas during the treatment period is avoided, although additional hydrochloric acid gas may be added to compensate for the loss of the hydrochloric acid gas through vaporization. In one form of the invention, a closed system is employed for decomposition of the tungsten minerals being treated. When vapors are given off from the concentrated hydrochloric acid, these vapors are condensed and returned to the system.

After the ore or concentrate is completely brought into solution by time-reaction, the solution is separated from its insoluble components including the gangue components. From the solution containing the tungsten and molybdenum compounds, the tungsten is precipitated as tungsten oxide, while the molybdenum constituents are kept in solution and the precipitated tungstic oxide thereafter recovered. This is effectively accomplished by carrying out the decomposition of the mineral material being treated at a temperature below about 70°C. when concentrated hydrochloric acid is used as the solution medium.

It has been discovered that using a strong acid for the decomposition step and keeping the temperature below about 70°C. when concentrated hydrochloric acid is used, there is substantially no precipitation of the tungsten or molybdenum compounds present in solution. The temperature of treatment must be below that temperature at which the tungsten compounds, including tungsten oxide, and the molybdenum compounds, including molybdenum oxide, begins to precipitate; that is, below 70°C. when using a concentrated hydrochloric acid solution. The temperature range during the decomposition treatment may be between 60° and 70°C., and more narrowly for the best results, between about 65°C. and 70°C.

It has also been discovered that for most satisfactory results, for every gram of tungsten present in the material being treated, said tungsten being expressed as tungstic oxide, $WO_3$, there should be present at least 20 ccs. of concentrated strong acid and especially concentrated hydrochloric acid. Less than this amount causes only partial solution of the tungsten component. The lower limit of concentration of hydrochloric acid present is therefore important. There is actually no limit to how great the ratio may be. Therefore, the upper limit can be any limit consistent with economical practice.

After the tungsten and molybdenum compounds and other impurities have been brought into solution preferably for the most satisfactory results under the conditions set forth, the tungsten compounds are precipitated from the acid solution while the molybdenum compounds are kept in solution. The precipitation of the tungsten compound present in the solution as tungstic trioxide is most effectively accomplished by heating the solution. The heat should be sufficient to effect the precipitation of tungstic trioxide. In general, the solution should be heated above 70° C. While it is not desired to be limited to any specific temperature of heating, satisfactory results are obtained when the strong acid solution as, for example, hydrochloric acid solution, is heated to about 95° C. Of course, the same result can be accomplished by a longer period of heating and the temperature may vary between 75° and 95° C., or between 80° or 85° and 95° C. The point is that the heating must be sufficient to precipitate the tungsten compound as its yellow tungsten oxide. During this heating step, loss of acid vapors is avoided by condensing the vapors.

At a temperature above 70° C. practically all of the tungsten constituents become insoluble in the strong acid solution as, for example, the concentrated hydrochloric acid solution, and precipitates as the pure tungstic yellow oxide, leaving the molybdenum compounds and all of the other acid soluble impurities in solution. The precipitated tungsten oxide is then separated from its mother liquor and washed with concentrated hydrochloric acid, then with weak hydrochloric acid, and finally washed with a weak solution of a neutral salt to remove all minute traces of acid soluble impurities.

Strong hydrochloric acid solution derived from the precipitation of the tungsten oxide $WO_3$, and the strong acid washes may be reused to treat a subsequent batch of ore or concentrate. Washing the tungstic oxide with clean, strong acid is preferably carried out in a closed system, thereby avoiding loss of the acid.

When a point of impurity saturation is reached in the strong treatment solution and in the washing acid, the free and combined acid may be recovered by distilling with strong sulphuric acid, thereby regenerating the hydrochloric acid for reuse in the treatment of a subsequent batch of ore or concentrate. Therefore, one of the advantages of the present invention is that from the cost standpoint, the only substantial cost for reagents is the cost of the sulphuric acid used for regenerating the hydrochloric acid.

Therefore, in accordance with the present invention, scheelite and powellite and scheelite-powellite minerals, including isomorphic mixtures of scheelite and powellite, may be decomposed at a temperature under 70° C. with a strong acid, such as concentrated hydrochloric acid, and if the temperature of decomposition is kept below 70° C., the tungsten and molybdenum compounds will remain in solution without precipitation, the process being carried out at ordinary atmospheric pressure, although super-atmospheric pressures may be used, and this decomposition is accomplished in a very short time as, for example, in from 15 to 60 minutes, and usually in from 15 to 20 to 30 minutes instead of hours, as in the prior art process. Of course, the time necessary for complete solution of all of the tungsten is dependent on the fineness and type of material treated and also on the temperature employed below 70° C. For example, if 1 gram of pure scheelite-powellite ore passing through —100 mesh and analyzing 93.05% scheelite and 6.95% powellite is treated at room temperature; that is, 20° C. with 5 ccs. of concentrated hydrochloric acid for a period of one hour, much of the material treated is undecomposed.

This illustrates that at the said low temperature of treatment and in the presence of such a small volume of acid, the results achieved are not satisfactory. The hydrochloric acid solution of the tungsten and molybdenum compounds along with lime, iron, manganese, and many other acid-soluble impurities, is completely stable if the temperature of the hydrochloric acid solution is maintained below 70° C. and the loss of solvent hydrochloric acid gas is avoided. However, as soon as the temperature is raised above 70° C. as, for example, to 90° or 95° C., practically all of the tungsten becomes insoluble in the strong acid solution and precipitates out as dense, pure, yellow oxide, leaving the molybdenum compounds and all of the other acid soluble constituent impurities in solution.

If precipitation of the tungstic and molybdic acids were allowed at the dissolution stage, then the reaction during dissolution would be hindered and unduly lengthened. Such a process is the basis of the prior art. However, in accordance with the present process, the tungsten and molybdenum compounds are dissolved along with other acid-soluble elements and held in solution at will, so that separation from insoluble gangue is easily effected by simple filtering or equivalent means. The separation of the tungstic acid from all other impurities including molybdenum, substantially irrespective of the amount of impurities present, is accomplished by simple heating of the concentrated hydrochloric acid solution which, because of its high acid content, permits no other compound or element to precipitate simultaneously with the tungstic oxide. It is because of the strong acid condition that it is possible to product tungstic oxide of a purity hitherto impossible to obtain except by a plurality of costly and time-consuming purification steps.

To crystallize the advance which has been made in the art and to enable a readily perceptible comparison of the prior art and the present invention, the following tabulation is made wherein there is set forth both alkaline and acid methods of the prior art, said methods being condensed to an average of numbered major steps necessary to obtain tungstic oxide of purity nearly equal to that obtained in practicing the present invention, which purity is seen from the spectrograms of the tungstic oxide produced by the examples following the tabulated data:

TABLE I

*Alkali methods*

Step:
1. Digest ore or concentrates with NaOH or $Na_2CO_3$ for a number of hours:
    a. Filter and wash gangue. Filtrate consists of solution of $Na_2WO_4$ and $Na_2MoO_4$
    b. Precipitate Mo with $Na_2S$
    c. Filter solution of $Na_2WO_4$
    d. Precipitate impure $WO_3$
2. Redissolve impure $WO_3$ with NaOH:
    a. Filter off insolubles
    b. Precipitate $WO_3$ with $CaCl_2$ as artificial scheelite
    c. Filter and wash
3. Redissolve $CaWO_4$ with concentrated HCl:
    a. Filter and wash $WO_3$
4. Redissolve $WO_3$ in $NH_4OH$ to form paratungstate:
    a. Evaporate and crystallize paratungstate
    b. Dry, ignite to pure $WO_3$

*Acid methods*

Step:
1. Digest ore or concentrate with HCl, $HNO_3$ or $H_2SO_4$ for a number of hours:
    a. Filter sludge of $WO_3$ and $MoO_3$ and gangue
2. Dissolve $WO_3$ and $MoO_3$ in NaOH:
    a. Filter and wash insolubles
    b. Separate Mo compound
    c. Precipitate impure $WO_3$ 3. Redissolve WO₃ with NaOH:
   a. Filter insolubles
   b. Precipitate WO₃ as artificial scheelite
4. Redissolve CaWO₄ with concentrated HCl:
   a. Filter and wash WO₃
5. Redissolve WO₃ in NH₄OH and crystallize as ammonium paratungstate:
   a. Evaporate and filter off crystals
   b. Dry, ignite to pure WO₃

*Method of present invention*

Step:
1. Dissolve ore or concentrate with concentrated HCl in short period of time necessary to bring material into solution, 15–30 minutes satisfactory with temperature under 70° C.:
   a. W and Mo compounds kept in solution. Filter acid insolubles.
   b. Heat filtrate of W, Mo, etc. compounds to 95° C. for a short period of time as, for example, 10–30 minutes.
   c. Filter and wash precipitated WO₃ free of impurities.

Prior to making a larger-than-gram-scale test, a series of experiments were made to determine the effect of time and of volume of strong hydrochloric acid (37.5% HCl) on the rate of solution of pure scheelite-powellite crystal (−100 mesh) and analyzing 93.05% scheelite and 6.95% powellite, 3.34% Mo. The results are tabulated in the following table, scheelite-powellite being designated as S. P.:

TABLE II

| Test # | S. P., grm. | Max. Temp., °C. | Vol. Conc. HCl, cc. | Time, mins. | Remarks |
|---|---|---|---|---|---|
| 1 | 1 | 57 | 10 | 12 | Much WO₃ reprecipitated. |
| 2 | 1 | 65 | 20 | 15 | Completely dissolved. Little WO₃ precipitated. |
| 3 | 1 | 65 | 30 | 15 | Completely dissolved. No WO₃ precipitated. |
| 4 | 1 | 65 | 40 | 20 | Do. |

The hydrochloric acid solution of tungsten and molybdenum compounds from test #3 was simply heated to 95° C. to precipitate the tungstic oxide. A spectrogram of this oxide showed less than .001% molybdenum.

The solution of tungsten and molybdenum from test #4 was treated by dilution with water to precipitate the tungstic acid. Addition of 8 ccs. of cold water failed to precipitate any tungstic oxide. Five more ccs. of water precipitated a flocculent, bulky precipitate of tungstic acid which turned yellow at a temperature of 72° C. This tungstic oxide showed a content of over 0.1% molybdenum.

It has been ascertained that about 5.07% WO₃ will remain in a concentrated hydrochloric acid solution having a specific gravity of 1.19 and containing 37.8% of HCl gas, without fear of precipitation when the temperature is kept at a maximum of 65° C.–70° C. It must not be allowed to rise above 70° C. Loss of HCl gas must also be avoided as well. The high acid concentration must be maintained at all times.

The following specific example illustrating the present invention was carried out on a larger-than-gram scale, employing a scheelite concentrate analyzing 67.75% WO₃, .05% Cu, .085% Mo, .06% As, .02% P, 7.0% Fe, 3.23% SiO₂, 15.7% CaO, .03% S, .026% Sn, .052% Pb, and .022% Bi:

Fifty (50) grams of the finely-ground, −200 mesh, concentrate was treated with 670 cc.'s of 22° Bé. HCl for thirty minutes at 60–65° C. with occasional stirring. The contents were then cooled to room temperature and filtered through a porous plate funnel. The clear solution of yellow color, due to dissolved ferric iron, was then heated to a temperature of 95° C. in a closed flask with water-cooled condenser to precipitate the tungsten held in solution. The tungstic oxide was filtered, washed five times with warm concentrated HCl, 10 times with ¼% HCl, and finally four times with 1% ammonium acetate solution. The washed oxide on ignition weighed 32.43 grams or 95.7% of the total present in the concentrate. A spectrogram run on the product showed the following impurities totalling .0819% to be present so that the oxide was 99.9181% pure; Ti—.04%; Si—.02%; Na—.008%; Mg—.002%; B—.002%; Ca—.0007%; Fe—.006%; Al—.002%; Bi—.0005%; Mn—.0003%; Cr—.0003%, and Cu—.0001%.

In the above example, there is employed 670 ccs. of hydrochloric acid. Since the specific gravity of 22° Bé. hydrochloric acid is 1.1789, the weight of hydrochloric acid employed is 670 times 1.18, which equals 790.6 grams. Hydrochloric acid of 22° Bé. contains 36% HCl. Therefore, the number of grams of hydrochloric acid present is equal to the weight of the concentrated hydrochloric acid, namely, 790.6 grams times .36, which results in the presence of 284.6 grams of HCl. In this example the ore contains 67.75% of tungsten expressed as tungstic oxide. Accordingly, there are present in the original ore 50 times .6775 gram of tungsten expressed as tungstic oxide, or 33.9 grams. Therefore, the weight ratio of hydrochloric acid to WO₃ equals 284 divided by 33.9 grams of tungsten expressed as tungstic oxide. As a result, the concentrated hydrochloric acid which is used contains 8.37 or approximately 8.4 parts by weight of hydrochloric acid for each part by weight of tungsten present in the ore treated expressed as tungstic oxide WO₃.

The following is an additional example illustrating the present invention:

Fifty grams of finely-ground, −200 mesh, concentrate containing 26.53% tungstic oxide was treated with 265 ccs. of 22° Bé. HCl for thirty minutes at 60–65° C. with occasional stirring. The contents were cooled to room temperature, filtered as in the first example. The yield of pure tungstic oxide was 12.75 grams or 96.1%. The initial, low-grade oxide concentrate analyzed WO₃—26.53%; Mo—2.03%; Cu—.087%; Pb—.031%; S—.12%; Sn—.013%; P—.06%; Bi—.052%. Spectrographic analysis of the newly-produced tungstic oxide showed it to be 99.9665% pure with impurities as follows: Ti—.012%; Si—.008%; Na—.006%; Mg—.0005%; B—.0013%; Ca—.0005%; Fe—.0043%; Al—.0007%; Bi—none; Mn—.0002%; Cr—none; Cu—none.

In this example, 265 ccs. of 22° Bé. hydrochloric acid are used, and calculating in the same manner as has been set forth for Example 1, there is present 112.6 grams of HCl. The weight ratio of the hydrochloric acid to tungsten expressed as tungstic oxide is, therefore, obtained by dividing the 112.6 grams of hydrochloric acid which are utilized in treating the ore, by 13.3 grams of tungsten expressed as tungstic oxide. It is, therefore, clear that the concentrated hydrochloric acid used contains 8.46 parts by weight of hydrochloric acid for each part by weight of tungsten expressed as tungstic oxide WO₃.

The thoroughness with which the precipitated WO₃ is washed with concentrated HCl determines the removal of occluded, undesirable compounds or elements. Washing with dilute acid solution only does not remove certain elements like titanium, silicon, molybdenum, and bismuth, because they are hydrolyzed in aqueous solutions containing even fairly large percentages of acid.

In practicing the present invention the type of equipment used may be somewhat the same as is used in the manufacture of hydrochloric acid. Dissolution of ore or concentrate can be effected in closed vessels of glass, silica, or silica brick with means of agitation or no agitation if a percolation tower is used.

The tungstic oxide referred to in the specification is the trioxide $WO_3$. This oxide is derived from tungstic acid $H_2WO_4$. The term "concentrated hydrochloric acid" as used in the present specification defines hydrochloric acid containing a concentration of between 35% hydrochloric acid and 37.8% hydrochloric acid. The usual concentrated hydrochloric acid is defined by Hackh's, Third Edition, page 419, as containing not less than 35% hydrochloric acid. The fuming hydrochloric acid solution which, of course, is a concentrated solution, contains about 37% or 37.8% of hydrochloric acid. The present process can be carried out using hydrochloric acid containing 36.5% of hydrochloric acid.

The tungstic oxide precipitated from the solution is up to 96.1% pure. It may be freed of impurities by filtration and washing the precipitated tungstic oxide five times with concentrated hydrochloric acid, ten times with ¼% hydrochloric acid, and four times with 1% solution of ammonium acetate to yield a tungstic oxide product of 99.92% to 99.96% purity. The purity of the tungstic oxide is so high that it may be directly used for the manufacture of tungsten metal for thermionic valves, contact points, electric light filaments, and the like.

A variation of the basic process, using concentrated hydrochloric acid is to pump hydrochloric acid gas, HCl, into a water slurry of the finely-ground ore or concentrate of tungsten-bearing materials, or pure HCl gas may be pumped into a reaction mixture of finely-ground ore or concentrate and concentrated, 37.5% HCl, acid to prevent lowering the HCl content at any time during the reaction of dissolution. Under pressure, the rapidity of dissolution will be hastened or accelerated, and since more HCl gas will dissolve in a given quantity of water solution of the acid, more tungstic oxide, $WO_3$, will be held in solution. Release of the pressure after dissolution is completed and the liquid filtered under pressure will permit loss of HCl gas and precipitation of that quantity of $WO_3$ in excess of the amount soluble under 70° C. at normal pressure, which amount, as stated, is 5.07%.

Broadly, the pressure will vary between the limits of zero pounds per square inch above atmospheric pressure, and 75 pounds per square inch above atmospheric pressure. More narrowly, the pressure may vary between the limits of zero pounds per square inch above atmospheric pressure, and 30 pounds per square inch above atmospheric pressure.

The term "tungstic oxide," as herein set forth includes $WO_3.xH_2O$, and also the anhydride after drying and igniting. Tungstic acid itself is $H_2WO_4$. It yields salts with bivalent, elemental oxides termed tungstates, as with calcium oxide, to form calcium tungstate $CaWO_4$.

Tungstic acid itself is the white, bulky precipitate obtained by diluting a concentrated HCl solution of tungstic acid with water under a temperature of 70° C. When the temperature is raised above 70° C. it loses a variable quantity of water and then becomes yellow $WO_3.xH_2O$, the letter "x" being an integer representing the variable amount of water held. At a dull red heat it loses all this residual water and becomes yellow, anhydrous $WO_3$.

What is claimed is:

1. The process of recovering tungstic oxide of high purity substantially free of a molybdenum component and other contaminants from a mineral material containing a tungsten compound and other mineral constituents including a molybdenum compound isomorphic with said tungsten compound, comprising decomposing said material with at least approximately 20 cc.'s by volume of concentrated hydrochloric acid for each gram of tungsten present expressed as tungstic oxide, $WO_3$, said hydrochloric acid solution being maintained at a temperature between about 60° C. and below 70° C., the tungsten and molybdenum compounds being substantially completely maintained in solution during the treatment period together with any acid soluble impurities derived from the material treated, the hydrochloric acid solution being maintained during the treatment period in its concentrated state, separating the resulting solution containing the tungsten compound and the molybdenum compound, and any acid-soluble impurities, heating the separated concentrated hydrochloric acid solution containing tungsten and molybdenum compounds above a temperature of 70° C. and thereby precipitating the tungsten-content of said solution as acid-insoluble yellow tungstic oxide while keeping the molybdenum compound and any impurities in solution, and recovering the precipitated tungstic oxide from the so-treated solution.

2. The process defined in claim 9 in which the mineral material being treated is selected from the group of materials consisting of scheelite mineral material, powellite mineral material, scheelite-powellite mineral material, ferberite mineral material, hubernite mineral material, wolframite mineral material, and concentrates derived from each of said materials.

3. The process defined in claim 1 in which the mineral material contains less than 60% of tungsten expressed as tungstic oxide.

4. The process defined in claim 1 in which the precipitated tungstic oxide is washed with concentrated hydrochloric acid solution, then with a weak hydrochloric acid solution and then with a solution of neutral salt to remove traces of acid-soluble impurities.

5. The process defined in claim 1 in which the precipitated tungstic oxide is washed with concentrated hydrochloric acid, then with a ¼% hydrochloric acid solution and then with a 1% ammonium acetate solution.

6. The process defined in claim 1 in which the mineral material containing the tungsten and molybdenum compounds is treated under a pressure of between 0 and 75 pounds per square inch above atmospheric pressure.

7. The process of recovering tungstic oxide of high purity substantially free of a molybdenum component and other contaminants from a mineral material containing a tungsten compound and other mineral constituents including a molybdenum compound isomorphic with said tungsten compound, comprising decomposing said material with at least approximately 20 cc.'s by volume of concentrated hydrochloric acid for each gram of tungsten present expressed as tungstic oxide, $WO_3$, said hydrochloric acid solution being maintained at a temperature between about 60° C. and below 70° C., the tungsten and molybdenum compounds being substantially completely maintained in solution during the treatment period together with any acid-soluble impurities derived from the material treated, the hydrochloric acid solution being maintained during the treatment period in its concentrated state, separating the resulting solution containing the tungsten compound and the molybdenum compound, and any acid-soluble impurities, heating the separated concentrated hydrochloric acid solution containing tungsten and molybdenum compounds at a temperature between above 70° C. and about 95° C. and thereby precipitating the tungsten content of said solution as acid-insoluble yellow tungstic oxide while keeping the molybdenum compound and any impurities in solution, and recovering the precipitated tungstic oxide from the so-treated solution.

8. The process defined in claim 1 in which the mineral material is treated in a closed system with concentrated hydrochloric acid while constantly condensing hydrochloric acid given off during the reaction period, said hydrochloric acid gas being returned during said reaction period to the hydrochloric acid treatment solution.

9. The process of recovering tungstic oxide substantially free of impurities from a mineral material containing a tungsten compound soluble in concentrated hydrochloric acid, comprising decomposing said mineral material with at least approximately 20 cc.'s by volume of concentrated hydrochloric acid for each gram of tungsten present expressed as tungstic oxide, $WO_3$, said hydrochloric acid solution being maintained at a temperature between about 60° C. and below 70° C., the hydrochloric acid being kept in its concentrated state during the treatment period, said tungsten compound remaining in solution during said treatment period, selectively precipitating from said hydrochloric acid solution acid-insoluble yellow tungstic oxide by heating said solution to a temperature above 70° C., and recovering therefrom the precitated tungstic oxide.

10. The process defined in claim 9 in which the insoluble yellow tungstic oxide is precipitated from its hydrochloric acid solution by heating said solution to a temperature between above 70° C. and about 95° C.

11. The process defined in claim 9 in which the mineral material is treated in a closed system with concentrated hydrochloric acid while constantly condensing hydrochloric acid gas given off during the reaction period, said hydrochloric acid gas being returned during the reaction period to the hydrochloric acid treatment solution.

12. The process of recovering tungstic oxide substantially free of impurities from a mineral material containing a tungsten compound soluble in concentrated hydrochloric acid comprising decomposing said mineral material with concentrated hydrochloric acid, said concentrated hydrochloric acid containing at least approximately 8.4 parts by weights of HCl for each part by weight of tungsten present expressed as tungstic oxide, $WO_3$, said hydrochloric acid solution being maintained at a temperature between about 60° C. and below 70° C., the hydrochloric acid being kept in its concentrated state during the treatment period, said tungsten compound remaining in solution during said treatment period, selectively precipitating from said hydrochloric acid solution acid-insoluble yellow tungstic oxide by heating said solution to a temperature above 70° C., and recovering therefrom the precipitated tungstic oxide.

13. In the process of recovering tungstic oxide of high purity from a tungstate-containing material soluble in concentrated hydrochloric acid, the step of decomposing said tungstate-containing material with at least approximately 20 cc.'s by volume of concentrated hydrochloric acid for each gram of tungsten present expressed as tungstic oxide, $WO_3$, said hydrochloric acid solution being maintained at a temperature between about 60° C. and below 70° C., the hydrochloric acid being kept in its concentrated state during the treatment period, said tungsten compound remaining in solution during said treatment period, selectively precipitating from said hydrochloric acid solution acid-insoluble yellow tungstic oxide by heating said solution to a temperature above 70° C., and recovering therefrom the precipitated tungstic oxide.

References Cited in the file of this patent

UNITED STATES PATENTS

| | | |
|---|---|---|
| 1,972,136 | Driggs | Sept. 4, 1934 |
| 2,255,210 | Furey | Sept. 9, 1941 |
| 2,261,663 | Rheineck | Nov. 4, 1941 |
| 2,437,870 | Williams | Mar. 16, 1948 |

FOREIGN PATENTS

| | | |
|---|---|---|
| 241,399 | Great Britain | Oct. 22, 1925 |

OTHER REFERENCES

Mellor: "Comprehensive Treatise on Inorganic and Theoretical Chemistry," vol. 11, page 687.

Smithells: "Tungsten," second edition, revised, 1945, published by Chapman and Hall, England, page 14.